United States Patent [19]
Schluckebier

[11] 3,747,426
[45] July 24, 1973

[54] ADJUSTABLE STEERING COLUMN

[75] Inventor: Floyd A. Schluckebier, Frankenmuth, Mich.

[73] Assignee: General Motors Corporation, Detroit, Mich.

[22] Filed: Nov. 18, 1971

[21] Appl. No.: 199,961

[52] U.S. Cl. .................................. 74/492, 74/531
[51] Int. Cl. .............................................. B62d 1/18
[58] Field of Search ........................ 74/493, 492, 531

[56] References Cited
UNITED STATES PATENTS 3,188,880  6/1965  Caine .................................... 74/493
3,276,287  10/1966  Albrecht ............................... 74/493

Primary Examiner—Milton Kaufman
Attorney—W. E. Finken and D. L. Ellis

[57] ABSTRACT

A telescopically adjustable automotive vehicle steering column includes improved telescopic adjustment locking means wherein a remote inner end portion of the inner of a pair of telescopically related steering shaft sections is formed with radially yieldable legs frictionally lockable with the outer shaft section under the pressure of forced inward projection of a push rod shiftable within the inner shaft section by steering wheel mounted actuating means.

1 Claim, 6 Drawing Figures

ADJUSTABLE STEERING COLUMN

This invention relates to steering mechanisms and more particularly to telescopically adjustable steering column assemblies and to adjustment locking means therefor.

The present invention aims at improving the telescopic adjustment function of steering column assemblies such as that disclosed in U.S. Pat. No. 3,258,987 to Zeigler et al. In that patent, a tiltable and telescopically adjustable steering column assembly includes inner and outer steering shaft sections adjustable to various selected telescopic relations to effect selected axial positional adjustment of the steering wheel relative to the vehicle operator's seat. The shaft sections are selectively lockable in their adjusted relation by a manually actuable locking push rod shiftable within a central bore of the inner section to effect locking and unlocking engagement between the shaft sections.

By the present invention, improvement is made in the locking means for the shaft sections and has as its objective a reduction in the number of parts and in the complexity of prior telescopic shaft locking arrangements.

A principal feature of this invention is that it provides locking means for such telescopic inner and outer shaft sections as above-described and achieves the objective of complexity reduction by specially forming an inner end portion of the inner shaft section with radially spreadable leg elements responsive to the pressure of a selectively inwardly forcible push rod to effect locking engagement between such yieldable leg elements and the inner wall of the outer shaft section.

The preceding and other features and advantages of the invention will be readily apparent from the following specification and from the drawings wherein.

Figure 1:
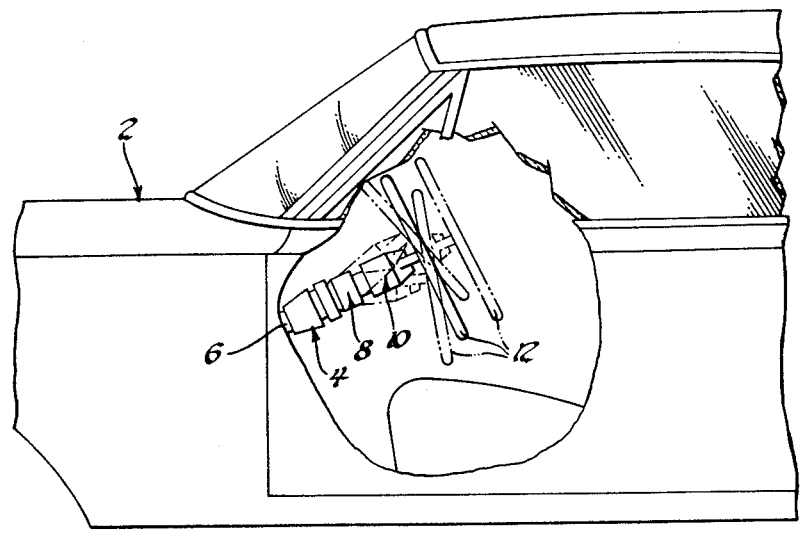
FIG. 1 is a fragmentary side elevational view of a portion of a passenger vehicle with parts broken away to illustrate a steering column assembly including this invention.

Referring now to the drawings and particularly FIG. 1, there is shown a portion of a conventional passenger car identified by the reference numeral 2. Disposed interiorly of the vehicle in the usual position is a steering column assembly 4 comprising an angularly inclined fixed lower section 6 and a tiltable upper section 8 which includes an upper telescoping section 10 and the usual steering wheel 12. As shown in dotted lines, the upper section 8, telescoping section 10 and steering wheel 12 are adapted for tilting movement as a unit about a horizontal transverse axis both upwardly and downwardly from the normal position shown in solid lines wherein the plane of the steering wheel is normal to the axis of column 6. In addition, the telescoping section 10 and wheel 12 are axially movable relative to upper section 8 either concurrently with tilting adjustment or independently thereof to extablish varying longitudinal positions for the wheel 12 relative to the vehicle operator, not shown.

Figure 2:
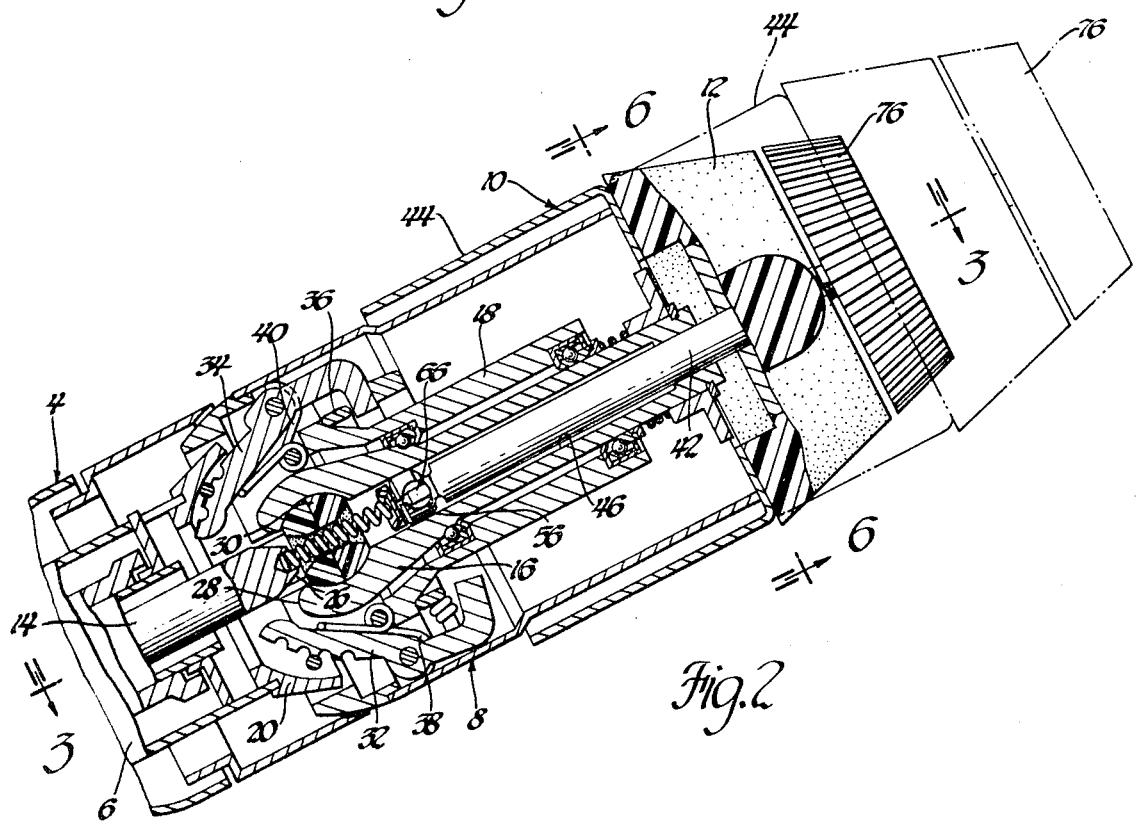
FIG. 2 is an enlarged side elevational view, partly in section with parts broken away, showing details of the steering column assembly.

As seen best in FIG. 2, steering column assembly 4 includes a lower steering shaft 14 rotatably journalled in the lower column portion 6. Axially aligned with lower shaft 14 is an upper steering shaft 16 which in turn is rotatably supported in a housing 18. As seen best in FIG. 3, housing 18 is pivotally connected with a lower support housing 20 on the upper end of section 6 by means of transversely spaced apart trunnions 22 and 24. Shafts 14 and 16 are operatively connected together by cross-yoke portions 26 and 28 at their adjacent ends which interlockingly engage in a cross-slotted ball 30, the geometric center of which coincides with the axis of trunnions 22 and 24. It will thus be seen that the upper section 8 and housing 18 mounted therein may be inclined upwardly and downwardly relative to section 6, while retaining a positive operating connection between upper shaft 16 and lower shaft 14. Locking of the angular position of section 8 relative to section 6 is accomplished by spring biased dual latch mechanisms 32 and 34 which are manually disengageable by a lever, not shown, acting on a lifter ring 36. It will be understood that upon release of the lever, spring elements 38 and 40 automatically bias the levers to restore a locked position. Inasmuch as details of construction of the tilting mechanism and latch means therefor form no part of the present invention, further description thereof is omitted. However, for a more complete description, reference may be had to U.S. Pat. No. 3,167,971 to Zeigler et al. In accordance with the principal feature of the invention, the telescoping section 10 which includes the steering wheel 12 is formed with a depending stub shaft 42 adapted for selective axial positioning relative to upper steering shaft 16 and a sleeve 44 which concentrically surrounds upper section 8.

Figure 3:
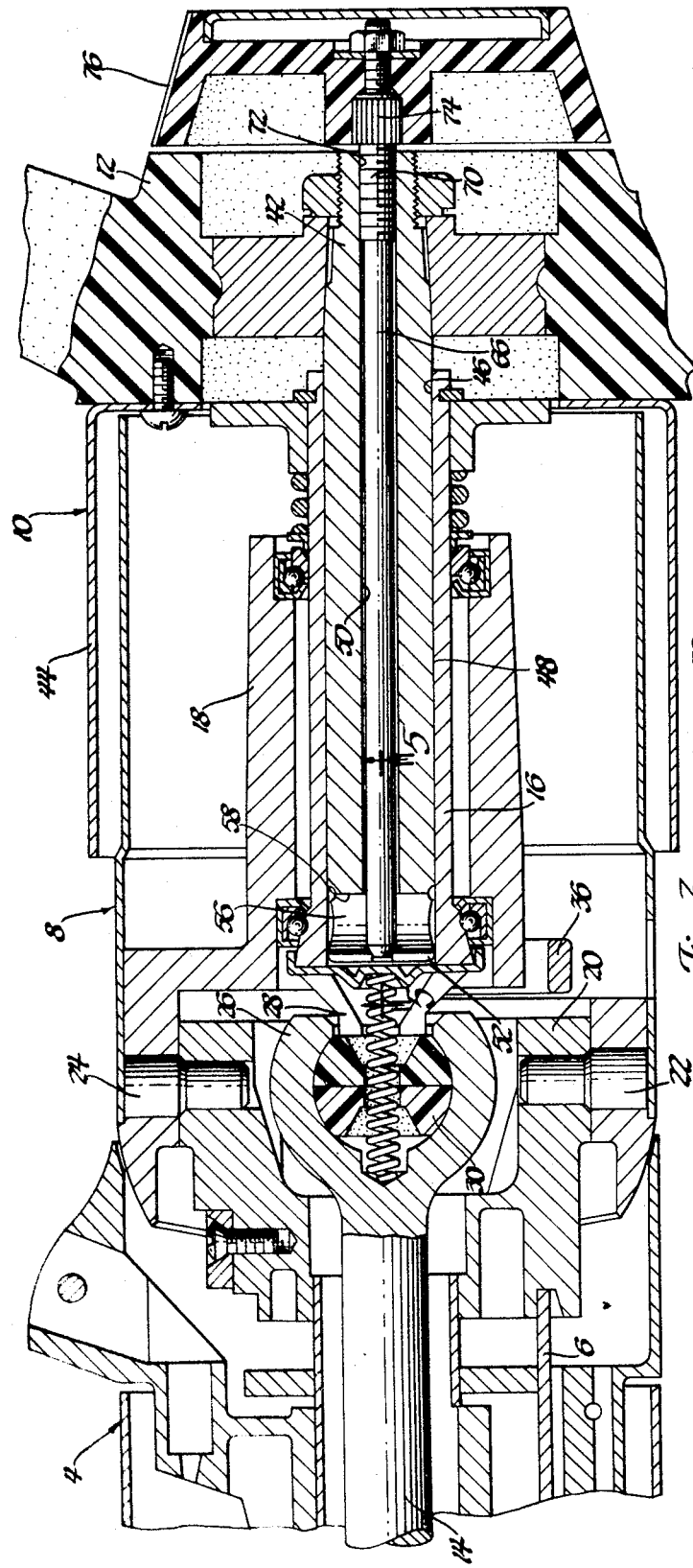
FIG. 3 is a further enlarged sectional plan view taken generally along the plane indicated by lines 3—3 of FIG. 2.
Figure 6:
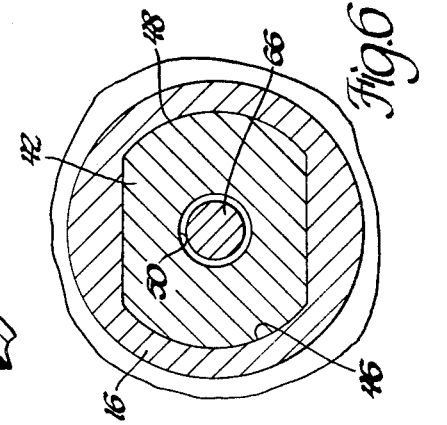
FIG. 6 is a sectional view taken generally along the plane indicated by lines 6—6 of FIG. 2.

As seen best in FIG. 3, upper steering shaft 16 is formed with a central longitudinal bore 46 in which the outer diameter 48 of stub shaft 42 slidably interfits. As shown in FIG. 6, the bore 46 of the upper steering shaft 16 is formed over a limited length adjacent its upper end with a double-D shape in section, and the stub shaft 42 is flatted on opposite sides to be complementarily formed and closely fitted in size a substantial portion of its length to this double-D portion of the upper shaft section to nonrotatably connect the parts for torque transmitting capability yet allow slidable longitudinal adjustment therebetween. A longitudinally drilled central passage 50 extends through the stub shaft 42.

Figure 4:
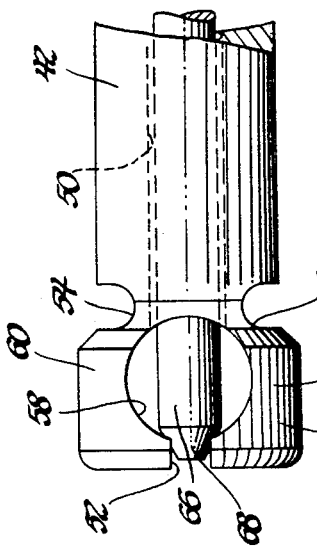
FIG. 4 is an enlarged side elevational view of the inner shaft section and push rod.

As indicated best in FIGS. 3 and 4, the remote or distal end wall of the inner end portion of stub shaft 42 is interrupted by a slot-like opening 52 extending completely trans-versely through the end wall. Spaced from such inner end wall, the stub shaft 42 is provided with a shallow annular groove and a pair of relatively deep side slots or undercuts 54. The double-D shaped sectional configuration of the stub shaft 42 ends at such undercuts to define a locking portion, generally designated 56 at the inner end of the stub shaft, such locking portion being of a cylindrical shape also closely sized to but normally readily slidable within the bore 46 of the upper steering shaft 16.

Figure 5:
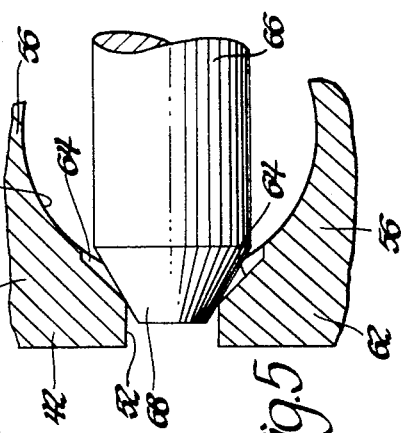
FIG. 5 is an enlarged sectional partial view taken generally along the plane indicated by lines 5—5 of FIG. 3.

As also seen in FIG. 4, locking portion 56 has in addition to the slot 52 a transverse bore 58 which communicates with the slot. The slot and bore splits the end of the stub shaft to define a pair of elastically yieldable legs 60 and 62 in the locking portion 56. Referring to FIG. 5, the locking portion 56 of the stub shaft 42 is provided interiorly thereof with a tapered or frusto-conical inner abutment wall formation 64 which takes the form of segments of a bore in the two leg elements 60 and 62. The wall formation 64 may be formed, if desired, as part of the drilling operation for passage 50.

Extending downwardly through passage 50 is an actuating rod 66 the remote end of which is provided with a conical surface 68. Surface 68 is preferably formed with a significantly lesser included angle than the included angle of the abutment wall formation 64 to avoid a locking taper engagement in the operation to be described hereinbelow. The upper end of actuating rod 66 is abutted with a threaded element 70 engaged with the internal threads 72 formed in the upper end portion of stub shaft 42. Alternatively, rod 66 and element 70 may be formed integrally. A fluted knob 76 is attached to the splined end 74 of element 70 so that the latter may threadably displace rod 66 in either sense longitudinally of passage 50 upon selected rotation in either direction of the knob. Accordingly, upon rotation of knob 76 in one direction, depending upon the hand of thread 72, push rod 66 may be forced or projected inwardly of stub shaft 42 to effect wedging engagement between surface 68 and wall formation 64 with substantial pressure or may be rotated in an opposite direction to allow withdrawal or ejection of the push rod outwardly of the stub shaft to relieve such pressure.

The selected projection inwardly of the push rod to engage surface 68, and wall formation 64 operates to elastically spread the leg elements 60 and 62 radially outwardly so that the cylindrical surfaces on the leg elements frictionally engage the inner wall of upper steering shaft 16 formed by the bore 46. Such radial spreading generally occurs as a flexing of the thin portions of the leg elements between the undercuts 54 and the bore 58. Of course, the elastic range is not to be exceeded in the material in these locations and selected withdrawal or ejection of the push rod relieving pressure between surface 68 and wall formation 64 allows the leg elements to return to a normal condition wherein the locking portion 56 is not frictionally engaged to any substantial degree with upper steering shaft 16. Thus, by selected rotation of the knob 76, the steering column may be unlocked for selected telescopic adjustment to a desired relation of steering wheel 12 relative to the passenger seat and the knob may then be rotated to frictionally lock the steering column in this selected condition. It is of course to be observed that rather than the smooth cylindrical surfaces of legs 60 and 62, alternative locking engagement may be had with the upper steering shaft 16 as, for example, through the provision of positively interengageable thread like ribs on the stub shaft engageable with a succession of annular ribs formed throughout the bore 46 of the upper steering shaft.

Having thus described the invention, what is claimed is:

1. In a selectively axially extensible steering column, the combination comprising inner and outer telescopically related steering shaft sections adapted for connection respectively to a steering wheel and a steering gear of an automotive vehicle, said inner shaft section being longitudinally centrally bored completely therethrough, the inner end portion of said shaft section having at least one transverse slot like opening in the distal end wall thereof, means in said inner end portion defining at least one transverse bore through said inner shaft section end portion communicating with said slot like opening, said slot like opening and said bore defining yieldable leg elements in said inner end portion, means forming segments of a tapered bore interiorly of said leg elements merging with said slot like opening and said transverse bore, and a manually actuable longitudinally shiftable push rod received within the longitudinal central bore of said inner shaft section, said push rod being selectively manually projectible inwardly of said inner shaft section to effect locking engagement between said inner and outer shaft sections and to outwardly withdrawable to release said locking engagement, the remote inner end of said push rod having a tapered surface cooperable with said tapered bore segments under selected inward projection of said push rod to radially spread said leg elements into locking engagement with the inner wall of said outer shaft section.

* * * * *